United States Patent [19]
Christian

[11] Patent Number: 5,339,798
[45] Date of Patent: Aug. 23, 1994

[54] MODULAR HOME SYSTEM

[76] Inventor: William D. Christian, P.O. Box 338, Moncure, N.C. 27559

[21] Appl. No.: 276

[22] Filed: Jan. 4, 1993

Related U.S. Application Data

[63] Continuation-in-part of Ser. No. 653,889, Feb. 11, 1991, Pat. No. 5,161,519, which is a continuation-in-part of Ser. No. 623,354, Dec. 7, 1990, Pat. No. 5,060,432.

[51] Int. Cl.$^5$ .......................... E04D 13/18; E04B 2/36; E02D 27/00
[52] U.S. Cl. ...................... 126/629; 52/265; 52/269; 52/295; 126/617; 126/633
[58] Field of Search ............ 52/233, 302.1, 302.3, 52/302.4, 264, 265, 269, 295, 169.9; 454/249, 252; 126/617, 620, 628, 629, 633

[56] References Cited

U.S. PATENT DOCUMENTS

| | | |
|---|---|---|
| 269,018 | 12/1882 | Crowell et al. |
| 354,342 | 12/1886 | Pratt . |
| 909,787 | 1/1909 | Hanley . |
| 1,192,027 | 7/1916 | Acheson . |
| 1,749,343 | 3/1930 | Hersh . |
| 1,801,193 | 4/1931 | Larkins . |
| 1,864,403 | 6/1932 | Bradley . |
| 2,101,349 | 12/1937 | Sharp . |
| 2,226,332 | 12/1940 | Bacei . |
| 2,269,926 | 1/1942 | Crooks . |
| 2,269,927 | 1/1942 | Crooks . |
| 2,661,511 | 12/1953 | Weyerchaeuser . |
| 3,336,704 | 8/1967 | Clay . |
| 4,006,856 | 2/1977 | Nilsson ............ 126/617 |
| 4,115,969 | 9/1978 | Napier . |
| 4,289,115 | 9/1981 | O'Hanlon . |
| 4,303,058 | 12/1981 | Chun ............ 126/620 |
| 4,324,289 | 4/1982 | Lahti . |
| 4,512,131 | 4/1985 | Laramore . |
| 4,575,982 | 3/1986 | Wenger . |
| 4,624,300 | 11/1986 | Stubbolo . |
| 4,747,231 | 5/1988 | LeMay . |

FOREIGN PATENT DOCUMENTS 8214744 12/1983 Japan .
0171391 9/1985 Japan .

*Primary Examiner*—Michael Safavi
*Attorney, Agent, or Firm*—Olive & Olive

[57] ABSTRACT

A modular panel system for constructing buildings. Panels are made from column structures which form fit so that they slide together to create the panel. Panels are specially constructed so that they serve as air conduits, through which air, both to and from the living space of the modular panel home passes. For use in cool weather, cool air is drawn from the living space into the wall panels of this invention, transferred to a solar panel air system where it is heated. The heated air is then transferred from the solar panel system into other wall panels of this invention and through these wall panels and into a specially designed heat collection floor panel. The heat collection floor panel receives the solar panel heated air which in turn heats a storage material in the floor panel and then is expelled into the living space for heating thereof. Once in the living space the air is cooled down and is drawn back into return wall panels. Cool air may be passed through the storage material and into the home in warm weather. Also incorporated into the present invention in combination with the heat collecting floor panels are tie-down straps which are anchored in concrete pads and which aid in providing a modular panel system which is highly wind/storm resistant.

10 Claims, 5 Drawing Sheets

MODULAR HOME SYSTEM

CROSS REFERENCE TO RELATED APPLICATIONS

This application is a continuation-in-part of patent application Ser. No. 07/653,889 filed Feb. 11, 1991, now U.S. Pat. No. 5,161,519 issued Nov. 10, 1992 and which was a continuation-in-part of patent application Ser. No. 07/623,354 filed Dec. 7, 1990, now U.S. Pat. No. 5,060,432 issued Oct. 29, 1991.

FIELD OF THE INVENTION

This invention relates to a building construction utilizing a modular panel system and a system for securing the building to the ground. In particular, this invention relates to a modular panel system constructed from log halves which are cut and shaped to allow them to interconnect for transferring air through a home built from the modular panels and for extracting, storing, and/or distributing heated air throughout the building constructed by the present invention panel system. The invention further relates to an integrated system for securing the panels of said system together and to the ground.

DESCRIPTION OF THE RELATED ART

Buildings of today are generally heated by central heating systems. Central heating systems for homes which run on electricity, gas, or oil are expensive to operate and are often inefficient. The present invention utilizes solar panels which take energy rays from the sun (light rays and infra-red rays) to heat air that will in turn heat the modular panel home.

Use of liquid solar panel systems as a heating system is well known in the art. Typically, these solar panels are glass panels under which copper tubes are placed. With various heat absorbing and heat reflecting surfaces surrounding the copper tubes, water that is run through the copper tubes is heated by rays from the sun. The heated water either itself acts as the hot water source, or it indirectly creates a hot water source by being channelled through a heat exchanger which transfers the heat from the solar-panel heated water to another water source.

The use of an air solar panel system in U.S. Pat. No. 5,161,519 and also in the present invention gains the advantages of solar heat but eliminates the use of water as the heat transferring medium which may create water leakage problems. Additionally, when using liquid solar panels to heat water in copper tubes, sufficient additional support must be provided underneath the solar heating system to bear its increased weight.

Air solar panel systems are also well known in the art and are used to overcome the disadvantages of liquid solar panel systems. A solar panel air system typically has a duct system, through which air to be heated is transferred to the solar panel and dispersed from the solar panel to the living space. Air systems are advantageous because unlike liquid, air does not freeze, boil or have a tendency to cause corrosion in the duct work. Additionally, air warmed in the air system can flow directly into the living space. Air collected in the solar panels can reach approximately 200 to 300 degrees Fahrenheit and therefore the solar air system provides a sufficient hot air source.

An air solar system may be used to heat a home built from panels of the modular panel system. The modular panel system of this invention uses part of the house itself, the panels, to transfer the air thus accomplishing several tasks. First, any heat loss occurring in the air transference is lost to the inside of the home and thus is still utilized in heating the home. Second, because the panels themselves act as air conduits, the need for external duct work is lessened, thereby reducing the overall cost of construction.

Numerous attempts have been made to make houses resistant to high winds as are found associated with hurricanes and tornadoes, for example, the house anchor of Bradley (U.S. Pat. No. 1,864,403) and the land anchor of Pratt (U.S. Pat. No. 354,342). The disclosure of these patents and all others cited herein is incorporated by reference. Previous anchorage systems generally rely primarily on external anchoring of the house, as well as on sound construction methods and do not provide an integrated system for securing the house to the ground.

It is therefore an object of this invention to provide a modular panel system for constructing a home or other buildings whose panels are adaptable for use in transferring air throughout the home.

It is also an object of this invention to provide a modular panel system which is both relatively inexpensive to construct and operate.

It is a further object of this invention to create air transferring panels for the modular panel home which eliminates the need for a conventional central electric, gas, or oil heating system, by utilizing a solar panel air system.

A still further object allows for storing heat generated by the solar panel air system by utilizing specialized floor panels as heat collectors.

It is still a further object of the invention to provide a building of modular panels which comprises an integrated system of securing the building to the ground.

Other objects and advantages will be more fully apparent from the following disclosure and appended claims.

SUMMARY OF THE INVENTION

The present invention incorporates by reference the application entitled "Modular Panel" (Ser. No. 07/623,354) now U.S. Pat. No. 5,060,432 which discloses a modular panel system having panels constructed of columns which are to be used for wall or floor panels. Further, application Ser. No. 07/653,889 entitled "Modular Panel As Air Transferring Conduit" now U.S. Pat. No. 5,161,519 modifies the panels of the previous patent somewhat to create air transferring panels which act as air conduits. The present invention utilizes specialized floor panels as heat collectors.

In both previous patents, as in the present invention, the panels are constructed from columns which are cut so that they slip together to create a panel. The columns may be constructed from a variety of materials, for example, wood, foam, core plywood, reinforced molded foam, or molded and reinforced VERMICULITE ™. Preferably, they are constructed from log halves which have a width of about six (6) inches and a height of about two (2) to two and one-half (2½) inches depending on the version of column being constructed. The logs may be sized by turning the timber in a turning lathe or other appropriate equipment until a diameter of approximately six (6) inches is reached. It may also be possible to use as columns log cores which remain after the wood used for making veneer is removed from the log. A particular advantage to using logs is that heated air which passes over wooden logs will not experience very much loss since wood is a poor heat conductor. Further, four (4) by four (4) or five (5) by five, (5) timbers direct from the saw mill may be used. The timber's four (4) corners are rounded and the timbers are then cut in half and used to make up the wall panels.

The two primary versions of columns as described in previous patent application (Ser. No. 07/623,354 now U.S. Pat. No. 5,060,432), are appropriate for use in previous patent application (Ser. No. 07/653,889 now U.S. Pat. No. 5,161,519), and also in the present invention system. The disclosure of these patents is incorporated herein by reference. The columns are constructed so that they slip together to create a panel. This form fit is accomplished through the use of a protrusion and a receptacle being cut from two opposite sides of each of the columns, and from at least one side of the external column as the columns are arranged in the panel. As a result, each column has a third and fourth side with corresponding protrusions and receptacles. There is a flat first side, being formed by initially cutting the column into two halves, and a second side opposite to the first side. This second side remains rounded and corresponds to the rounded outer surface of the column.

After the columns are fit together, as described above, they are secured together with liquid nails, or other wood seal. For the present invention, as was the case in U.S. Pat. No. 5,161,519, approximately eight (8) or nine (9) columns are joined to create a wall panel, four (4) feet in width. The particular species of tree timber used to construct the columns may determine the number of columns necessary to obtain a four (4) foot wide panel. Preferably, columns having a length of eight (8) feet will be used to create panels also having a length of eight (8) feet.

As in U.S. Pat. No. 5,161,519, the panels may serve as wall panels. Interior wall panels are constructed and may be used in conjunction with the exterior wall panels described in U.S. Pat. No. 5,060,432. The interior wall panels may be used with or without the added x-frame of U.S. Pat. No. 5,060,432 which is used on exterior wall panels. The x-frame is comprised of several beams which are attached to the flattened surface of the wall panel. The beams line the perimeter of the panel and also span across the width of the panel center. Additionally, beams traverse the wall panel, joining opposite corners, thus creating the "x" across the wall panel. The beams are attached to the wall panel by any conventional means, for example, nails, liquid nails, staples, corrugated clips or a combination thereof. The x-frame is generally placed on the wall panels at the time of assembly. At that time, the columns and x-frame may be glued and clamped together until set. If the modular panel home will be located in an especially cold climate, an x-frame for the interior wall may be desired so that a double thickness of insulation is obtained.

Whether or not the interior wall panel contains an x-frame, the inside face of the wall panel which is created by the first flat side of the columns is placed toward the exterior wall panel, and the ribbed face toward the interior of the home. As in U.S. Pat. No. 5,161,519, wall covering such as sheet rock or other appropriate paneling may be placed upon the ribbed face of the interior wall panel, thereby creating openings or channels. A channel is the substantially triangular space existing between adjacent columns and the wall covering. These channels extend the length of the wall panel and through them air passes into the living space of the modular panel home. Although all wall panels with wall covering will have channels because of their construction, not all wall panels will act as air transferring panels. Air transferring wall panels are spaced around the perimeter of the modular panel home in a manner which ensures even and effective air distribution into the home. The panels of the present invention may be used to transfer air for both heating and cooling of the home. Further, when it is desirable that the interior surface appear as a flat board surface, the X-frame may be eliminated and the assembled panel so positioned that the triangular spaces are facing inward. The entire ribbed surface is then facing inward toward the outside wall.

Panels may also serve as roof panels, constructed of approximately eight (8) or nine (9) columns which are each approximately six (6) inches wide. If longer than eight (8) foot roof panels are required, two panels may be joined to span the length of the roof rake.

The roof panel is placed with its flattened side upward and the ribbed surface down on the roof sheathing of conventional roof truss construction. The triangular shaped channels are thus created between the columns of the panel and the roof sheathing. Air which is utilized in the heating system passes through these channels.

As in U.S. Pat. No. 5,161,519 an air transferring panel may contain an air intake duct or an air outlet. The intake duct spans the entire width of a panel and is placed into a corresponding space which has been cut-out from the covering. The duct thereby engages each channel in the panel. A forced air supply is introduced into the intake duct at a first end of the panel, transferred through the panel to a second end, and ultimately into the solar panel air system to be heated. Heated air to be distributed to the living space of the modular panel home is taken from the solar air system, transferred to a first end of a second panel through the channels of the second panel to its second end, and expelled through an air outlet. The air outlet spans the entire width of the panel and is inserted into a corresponding space in the wall covering, thereby engaging all the channels of the panel.

The present invention utilizes a floor panel as found in U.S. Pat. No. 5,060,432 and which is modified so that heated air from the solar panel and air transfer panel of U.S. Pat. No. 5,161,519 is stored within the modified floor panel. Each modified floor panel has a heat storage area therein and through which the air flow must pass. Preferably the heat storage area contains material such as rock, stone or other coarse material.

The heat storage area comprises a series of weighted floor panels which make up the first of the components of the integrated securing system. The securing system also preferably includes external land anchors in which external straps extend over the building at a plurality of positions and have their ends anchored in or on the ground. Finally the securing system comprises internal connecting braces between the tops of the wall panels and the lower portion of the roof trusses, and between the bottoms of the wall panels and the floor panels.

Although specific dimensions and proportions have been described, it should be appreciated that these dimensions and proportions may vary.

Other aspects and features of the invention will be more fully apparent from the following disclosure and appended claims.

DETAILED DESCRIPTION OF THE INVENTION AND PREFERRED EMBODIMENTS THEREOF

The present invention discloses panels which act as air transferring conduits to aid in air circulation and distribution in a modular panel system home. Although air used to both cool and heat the modular panel home may be transferred through the panels, most of the discussion is limited to the use of the panels in conjunction with solar heated air which is distributed through the panels and into the living space of the modular panel home while providing heat storage and distribution means. Although discussed in the parent patents, for purposes of clarification, the construction of the columns which comprise the panels is discussed herein as well.

Each column, shown in outline form in FIG. 1, may be formed according to the various embodiments discussed below using a method of wood forming and cutting known in the art. Preferably, one-site operation may be used in which a raw log is debarked, placed on a sawmill log carriage and sized to the appropriate width and height. Subsequently the log is split lengthwise into two pieces which are appropriate size for the log planer or molder. The molding or planing machine is used to machine the log so that its cross-sectional form is according to the column embodiment being made. For example, a Model A 20 (manufactured by Yates-American Machine Co., Beloit, Wis.) may be used to machine the column.

Figure 1:
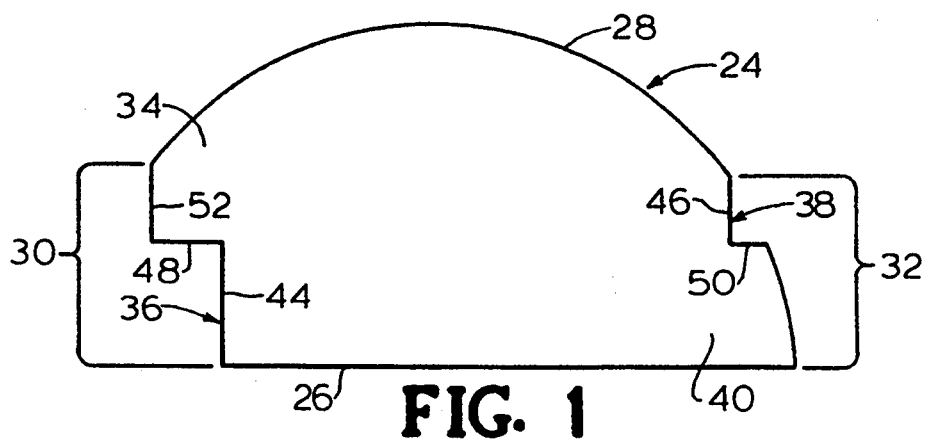
FIG. 1 is an end elevation view of a column of the invention as found in U.S. Pat. No. 5,060,432 and as utilized in U.S. Pat. No. 5,161,519 and as is employed in the present invention.
Figure 2:
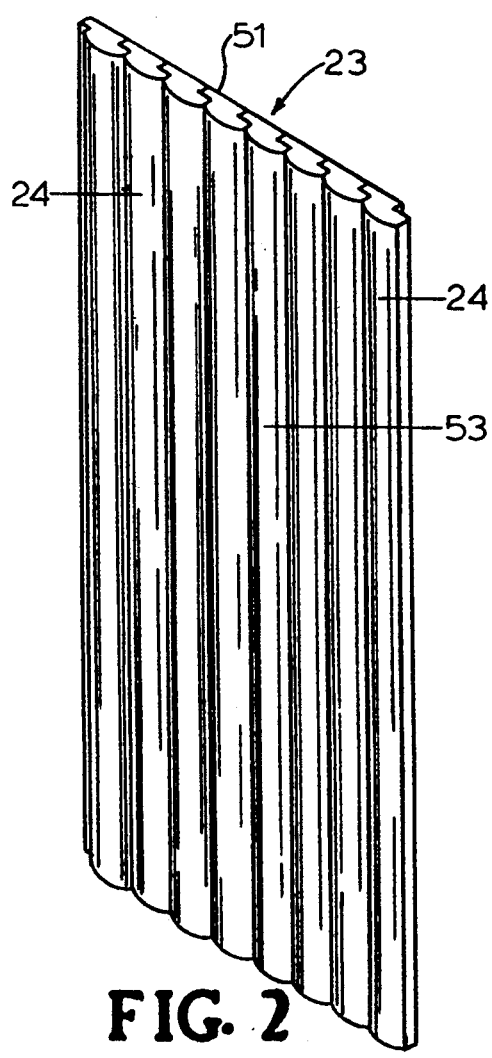
FIG. 2 is a perspective view of a modular panel constructed from the columns of FIG. 1.
Figure 3:
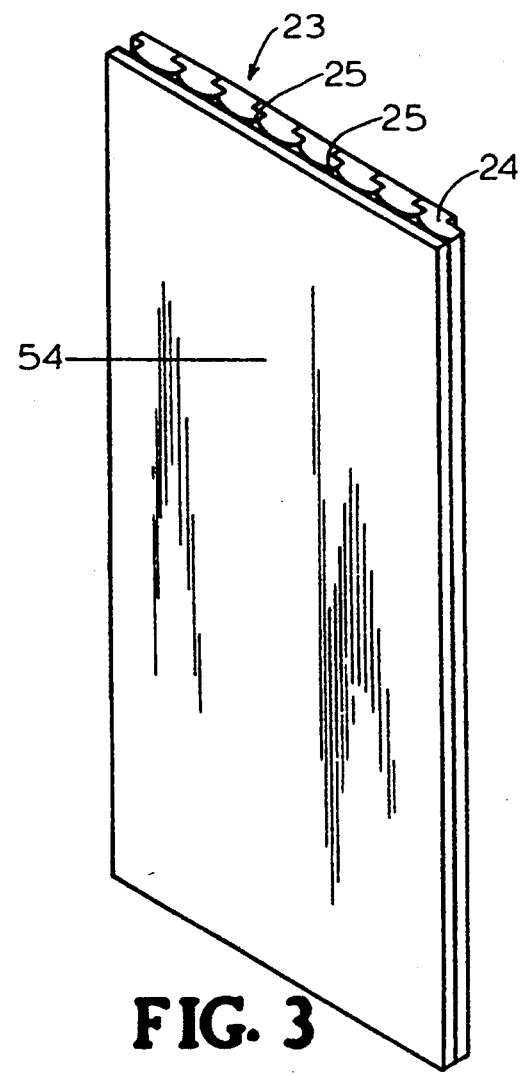
FIG. 3 is a perspective view of the panel of FIG. 2 with a covering attached.
Figure 4:
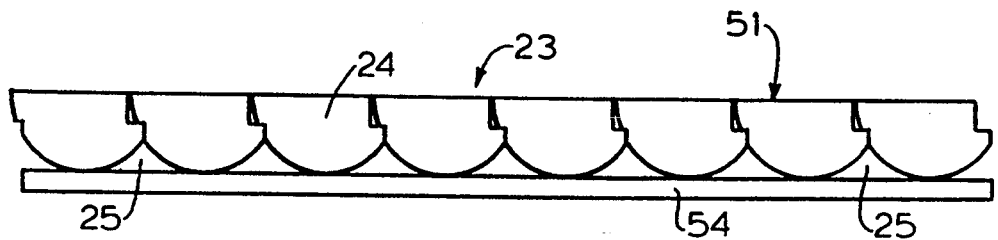
FIG. 4 is an end elevational view of the panel of FIG. 3.

Column 24 may be configured in at least two versions or embodiments, however, for purposes of this invention only one version is described, namely column 24, shown in FIG. 1. Column 24 has a first flat inner surface 26, a second side 28 opposite said first side 26 and used for the outer surface of a panel, a third side 30 and a fourth side 32, which are oppositely disposed from each other on column 24 and perpendicular to the flat inner surface 26. Third side 30 contains upper protrusion 34 and lower receptacle 36. Fourth side 32 contains upper receptacle 38 and lower protrusion 40. These two sides are shaped so that third side 30 and fourth side 32 fit together when two columns 24 are aligned adjacent to each other as shown in FIGS. 2, 3 and 4. For purposes of this description, a preferred arrangement of the protrusions and receptacles of the sides are discussed; however, it is possible to vary somewhat the shape of the protrusion and the corresponding receptacle.

Column 24 has as its second side 28 a rounded outer surface maintaining the rounded surface of the column as molded or planed. In each column, receptacles 36 and 38 are made by cutting out a section from the columns by making a vertical cut, perpendicular to inner surface 26, to form edge 44 or receptacle 36 adjacent second side 28. A horizontal second cut is made which is parallel to inner surface 26, forming parallel edge 48 of receptacle 36, and parallel edge 50 of receptacle 38. Upper cut 52 which is perpendicular to inner surface 26 and parallel to edge 46 is also made. When the cuts are made and those portions between and outside the cuts removed, protrusions 34 and 40 remain on the sides 30 and 32, respectively.

Columns 24 are joined by sliding together two adjacent columns 24, shown in FIGS. 2 and 4. Specifically, upper protrusion 34 of a first column 24 fits into upper receptacle 38 of an adjacent second column 24. Lower protrusion 40 of the second column 24 fits into lower receptacle 36 of the adjacent first column 24. Columns 24 slide easily together because receptacles 36 and 38 generally are the inverse shapes of protrusions 34 and 40, with the exception that in the preferred embodiment, protrusion 40 is not squared off but retains a rounded exterior surface. Upon joining columns 24, upper cut 52 and parallel edge 48 of one column 24 meets with perpendicular edge 46 and parallel edge 50 of the adjacent column 24. Columns 24 may be secured together with any conventional means; however liquid nails is a preferred method because of the convenience and appearance of liquid nails.

For purposes of this invention, the panels may be used as wall and roof panels, which are referred to as panel 23 in FIGS. 2, 3, and 4. Panel 23 is constructed from a plurality of adjoined columns 24, preferably eight (8) columns, each six (6) inches in width, to create a panel with the approximate dimensions of four (4) feet by eight (8) feet, although it may be constructed of a different size.

Each panel 23 has inside face 51 and ribbed surface 53. Inside face 51 corresponds to flat inner surface 26 of columns 24. Ribbed surface 53 corresponds to second side 28 of columns 24. Ribbed surface 53 faces the interior of the home. Subsequently covering 54 is placed over ribbed surface 53, thereby creating channels 25 shown in FIGS. 3 and 4. Channels 25 are formed by the generally triangular openings which extend the length of columns 24; two sides being created by the curved edges of adjacent columns 24 and the third side by the surface of covering 54. With a panel constructed of eight (8) six-inch (6") columns 24, seven (7) channels 25 are present in each panel 23, an eighth channel being created when two panels 23 are joined. On panels 23 which act as interior wall panels, preferably covering 54 is sheet rock which maximizes air flow through channels 25 and minimizes heat loss as the heated air passes through channels 25. On panels 23 which act as roof panels any conventional roof sheathing may act as covering 54.

X-frame 21 (not shown) of U.S. Pat. No. 5,060,432 may also be placed on inside face 51 of panel 23 which serves as an interior wall panel to obtain a space to place an additional layer of insulation for modular panel system homes. However, for moderate climates, panel 23 may be used without the added x-frame 21, and the homeowner may rely on the insulation which is placed into the x-frame of the exterior wall panels.

Preferably not every interior wall panel acts as an air transferring panel 23. The exact placement of air transferring panels 23 around the perimeter of the modular panel home depends on the floor plan of the home. Of course the desired objective is to obtain even distribution of heated or cooled air into the rooms of the modular panel home with exterior walls.

In the invention herein panels 23 serving as interior wall panels are preferably placed vertically so that the base of the interior wall panel is level with the bottom of the floor panels or other flooring and may be attached to the frame and floor construction of a home by means known in the art.

On top of interior wall panels 23 sit assembly caps (not shown), which are known in the relevant art. For those interior wall panels 23 which are not air transferring panels the assembly caps are no different than those known in the art, except that they may be slightly higher and wider. Assembly caps of this invention are preferably constructed from studs which measure approximately two (2) inches by six (6) inches so that the assembly caps extend across the full depth of panel 23 and covering 54. As discussed below, collecting box 58 is placed at the top of air transferring wall panels.

Panels 23 for the roof may also be used upon a conventional roof truss and may act as air transferring panels. An additional narrow support brace may be attached on inside face 51 to further secure the roof panel. If one eight-foot panel 23 is not sufficient length to extend the length of the roof rake, several panels 23 may be joined, end-to-end to acquire the needed length. Ribbed surface 53 is placed on the roof trusses and faces the interior of the modular panel home. Covering 54, in this embodiment is preferably roof sheathing, and is attached to ribbed surface 53 thereby creating channels 25.

Figure 5:
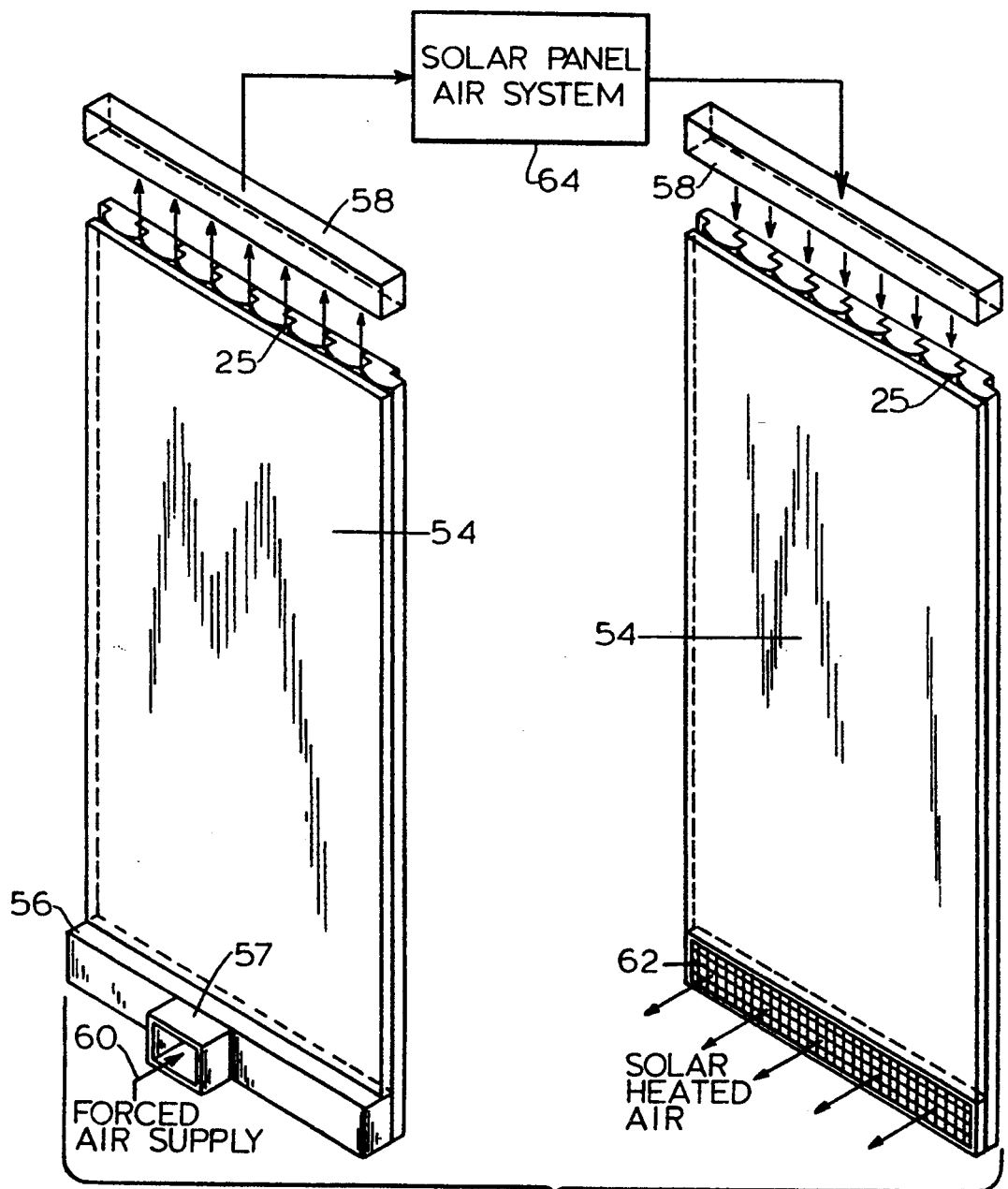
FIG. 5 is a flow diagram showing the pattern of air flow through panels as set forth in U.S. Pat. No. 5,161,519 and which is also employed in the present invention.

Referring now specifically to FIG. 5, the transfer of solar heated air through the panel system will be described. Located upon panel 23 is collecting box 58, shown in FIG. 5, which encloses an area above the openings of channels 25. The bottom face of collecting box 58 may be open or may contain an opening so as not to restrict air flow from channels 25 into collecting box 58. The top face of the collecting box 58 may contain one or several openings to permit air to flow between collecting box 58 and solar panel air system 64.

Intake duct 56, shown in FIG. 5, is placed at a first end of panel 23, opposite collecting box 58 at a second end of panel 23. Intake duct 56 is placed into covering 54 which has a space of corresponding dimensions in length and width to intake duct 56. Intake duct 56 spans the entire width of panel 23 thereby engaging each channel 25 of panel 23. It has two oppositely disposed edges which span panel 23 lengthwise; one closer than the other to the first end of panel 23. Intake duct 56 may be constructed at one edge to allow free air flow into channels 25 from intake duct 56. At its opposite edge, closer to first end of panel 23, intake duct 56 may be constructed to abut ribbed surface 53 so that air flows into channels 25 and through to the second end of panel 23. Intake duct 56 may also contain entrance 57 into which forced air supply 60 may enter intake duct 56. Forced air supply 60 is located outside panel 23. The air enters into intake duct 56 through entrance 57 and flows through channels 25 along the length of panel 23 into collection box 58.

From collecting box 58, the air flows to solar panel air system 64 where the air is heated through the use of solar energy. Subsequently, air to be circulated back into the living space is transferred into collecting box 58 located at a first end of a second panel 23. From collecting box 58 air flows through channels 25 and into air outlet 62 at a second at a second end opposite of first end of second panel 23. Air outlet 62 preferably extends the full width of panel 23 thereby engaging all channels 25. Air outlet 62 is inserted into covering 54 which contains an opening of corresponding dimensions in length and width to air outlet 62. Air outlet 62 has two oppositely disposed edges; one closer than the other to second end of second panel 23. Air outlet 62 may be constructed at one edge to allow free flow of air from channels 25 into air outlet 62. At its opposite edge, closer to the second end of panel 23, air outlet 62 is constructed to abut ribbed surface 53 thereby directing air out into the living space and not further into second end of second panel 23.

Figure 6:
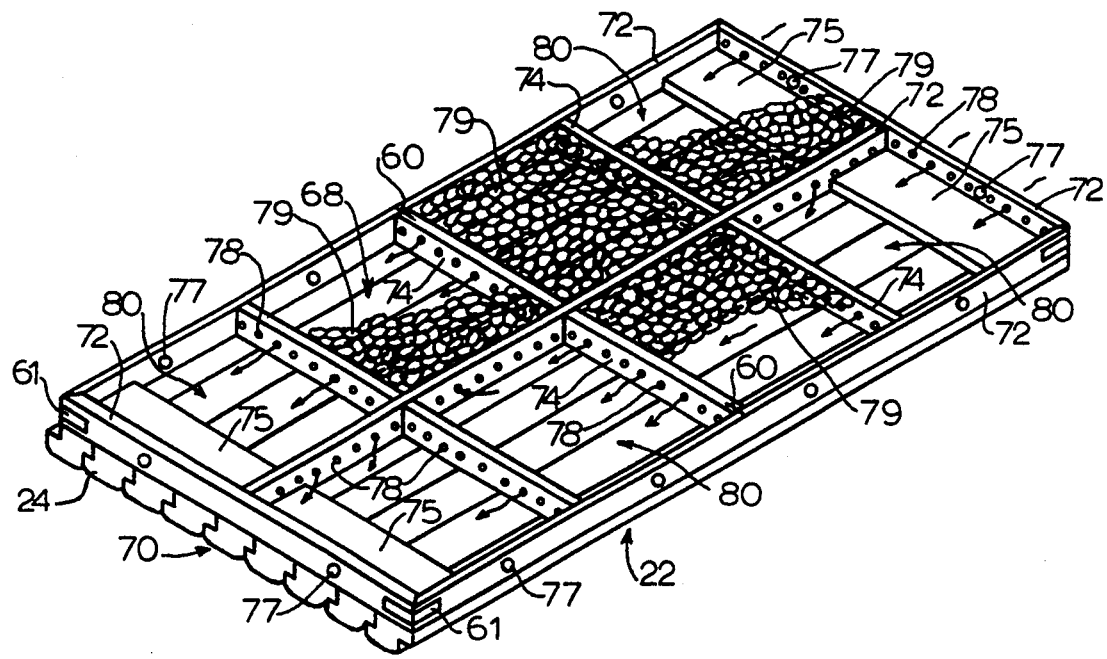
FIG. 6 is a perspective view of a modular floor panel incorporating heat retention/distribution means of the present invention.

Referring now specifically to FIGS. 5 and 6, the present invention modular home panels are used as an air transferring and heat collection system and will be described in detail. Floor panel 22 shown generally in FIG. 6, has top face 68 and bottom face 70. Top face 68 corresponds to the inner surface 26 of columns 24. Bottom face 70 corresponds to outer surface of second side 28 of columns 24. To top face 68, four perimeter joists 72 are attached along each outer edge of floor panel 22 and are mitered to meet each other in a 45% degree angle. A fifth joist 72 is attached to top face 68 done its vertical center extending the length of floor panel 22, and is attached to two of the perimeter joists 72. Cross-joists 74 are attached at various intervals in between joists 72. Six cross-joists 74 are shown and are the preferred number for a 4'×8' floor panel 22. Together these joists 72 and cross-joists 74 form a joist structure above top face 68 of floor panel 22. Joists 72 and cross-joists 74 are secured together at every joint with corrugated clips 60, nails, or a combination. The outside corners, where perimeter joists 72 meet at 45 degree angles, may contain corner brackets 61. Boards 75, approximately four (4) inches wide, and made out of half-inch (½") plywood, attach to top face 68 with liquid nails or nails at the four corners of top face 68 of floor panel 22. Boards 75 aid in securing and strengthening floor panel 22, and in securing floor panels 22 to building foundation sills.

The exact placement of joists 72 and cross-joists 74 on top face 68 of floor panel 22 depends on whether the floor panel 22 is one which attaches only to the other floor panels 22, or one which attaches to a wall panel 20. If the floor panel 22 is to be attached only to other floor panels 22, perimeter joists 72 are placed so that they are flush with the ends of columns 24 as shown in FIG. 6. However, if floor panel 22 is to be attached to a wall panel 20, joists 72 may be placed at a distance in from the perimeter edge of columns 24 forming a lip 76, shown in FIG. 7. Lip 76 abuts bottom portion of wall panel 20 when floor panel 22 is joined with wall panel 20 and the remaining bottom portion 64 forms overhang 65.

Joining floor panels 22 to other floor panels 22 may be accomplished by using bolts, washers and nuts at attachment points 77 located at varying intervals along joists 72. Nails could also be used, but they are less effective as securing means. A plastic film material may also be placed on the ends of floor panels 22 to aid in sealing the juncture between floor panels 22 and to allow for expansion of them.

Figure 7:
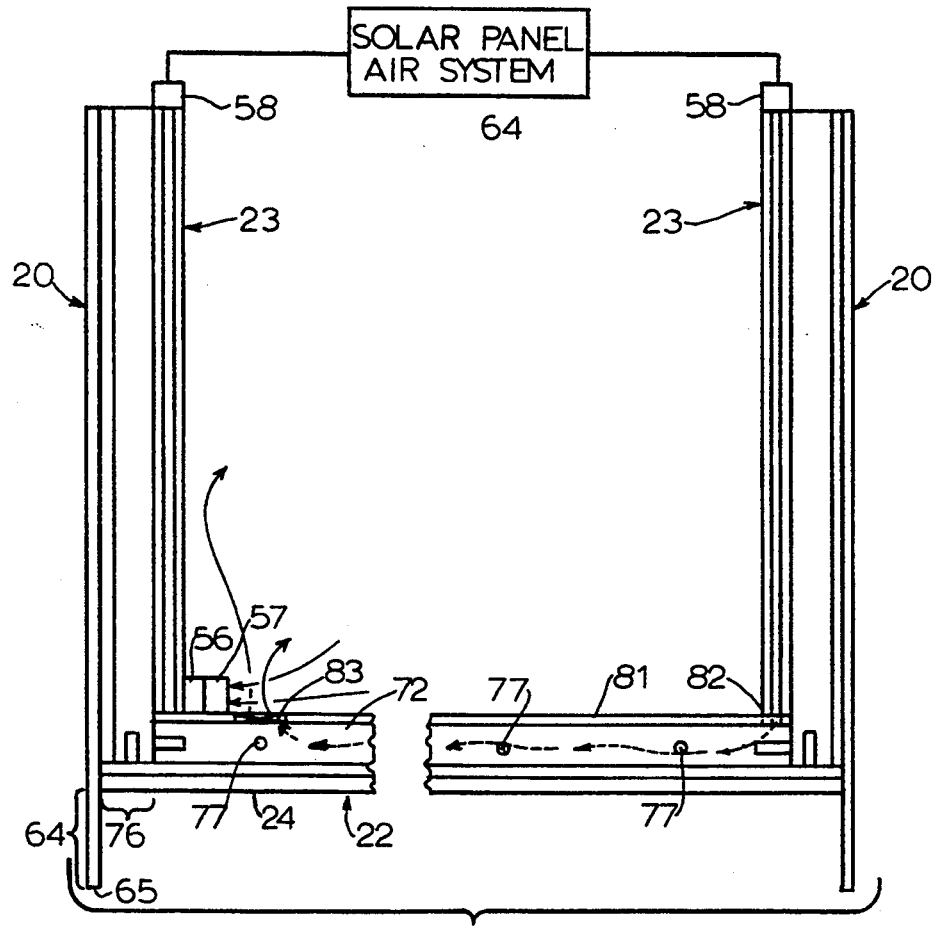
FIG. 7 is an elevational cross-sectional view of a pair of modified modular wall panels, a pair of modified interior wall panels, and joined with a modular floor panel of FIG. 5 and illustrating the air flow pattern of the present invention for a modular home panel system when the system is used for heating.
Figure 10:
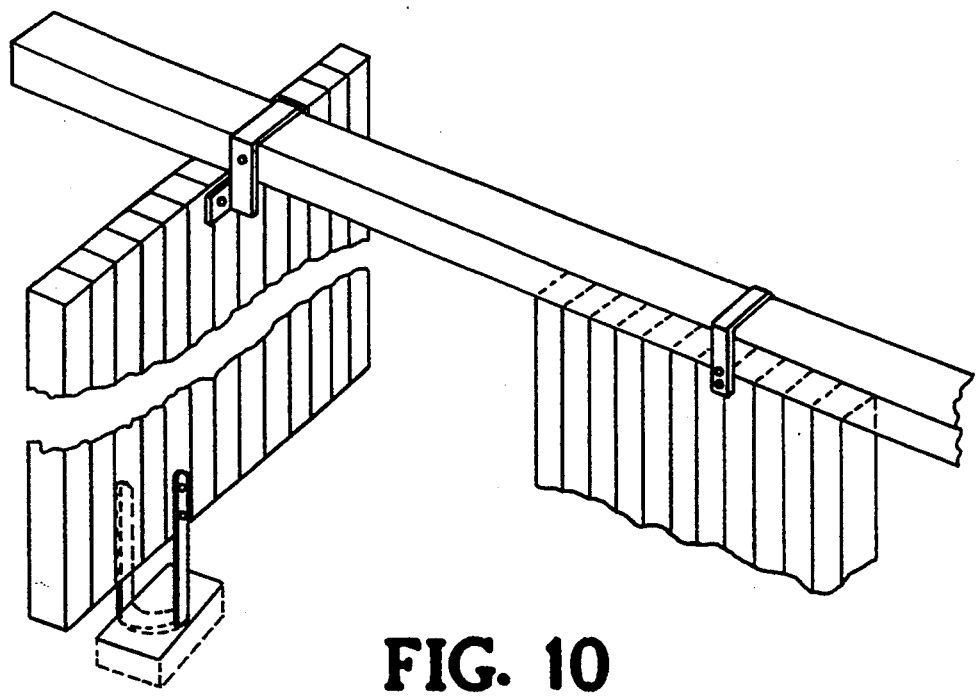
FIG. 10 is a perspective view of brackets which may be used on the partition walls of the modular home.

Joining wall panels 20 to floor panels 22 may be achieved in the following manner. First, wall panel 20 is secured to floor panel 22, with liquid nails or with any other appropriate wood seal or glue, where x-frame (not shown) abuts perimeter joists 72 and where bottom portion 64 abuts a lip 76, as shown in FIG. 7. A lag bolt may then be used to further secure the x-frame (not shown) to perimeter joists 72. Bottom portion 64 may extend further below floor panel 22 to form overhang 65 as shown in FIG. 7. Additional brackets are preferably used on all interior partition walls to add strength to the attachment between the interior wall panels and the floor panels. Preferred embodiments of these brackets are shown in FIG. 10. Toward the left end of the horizontal roof member (joist) shown in FIG. 10, a perpendicular partition wall is fastened by a first bracket embodiment to the joist while a parallel partition wall is fastened by a second bracket embodiment. A lower bracket embodiment usable on all walls is also shown on the perpendicular wall, with the lower portion of this "U"-shaped bracket being embedded in cement.

Floor panel 22, as shown in FIG. 6, comprises the heat collection portion of the present invention system. Selected joists 72 have a predetermined number of holes 78 drilled therethrough. Preferably in most of the floor panels 22, within the areas confined by joists 72 and cross-joists 74, a heat retaining or storing material 79 is placed. In the presently illustrated embodiment of FIG. 6, material 79 comprises one-fifth (1/5) size rock. However, material 79 may comprise rocks, stone, etc. Preferably, material 79 is large size washed gravel. For illustrative purposes, only a few of the storage areas 80 are shown filled with material 79. Preferably most storage areas 80 of all floor panels are filled with material 79 (see discussion of FIG. 9 below). As illustrated by arrows in FIG. 6, air flow enters panel 22 at one end, flows through material 79, through holes 78 in various of areas 80 and eventually works its way toward the end opposite the entry end. As shown in FIG. 7, floor panel 22 is covered by floor sheathing 81 in a conventional manner.

FIG. 7 illustrates floor heat storage panel 22 secured in place between a pair of exterior wall panels 20. Interior wall panels 23 are secured to conventional wall panels 20. For use in cooler months, the air delivery side of wall panel 23 is modified somewhat so that heated air from solar panel air system 64 is passed through channels 25 and is discharged into floor panel 22 through and opening 82 cut in floor sheathing 81. As previously discussed, heated air travels through material 79, through holes 78 in joists 72 and cross-joists 74, and toward the opposite end beneath floor sheathing 81. A second air supply wall panel 23 is secured to an exterior wall panel as seen in FIG. 7. Air from floor panel 22 passes into the room to be heated through holes or grills 83. Air from the room is then drawn back into the system through intake duct 56 through entrance 57. Thus, a completed cycle of air is accomplished. Material 79 stores a portion of heat from solar panel air system 64 and is utilized to help heat at night or on cloudy days when system 64 is not at maximum efficiency.

Figure 9:
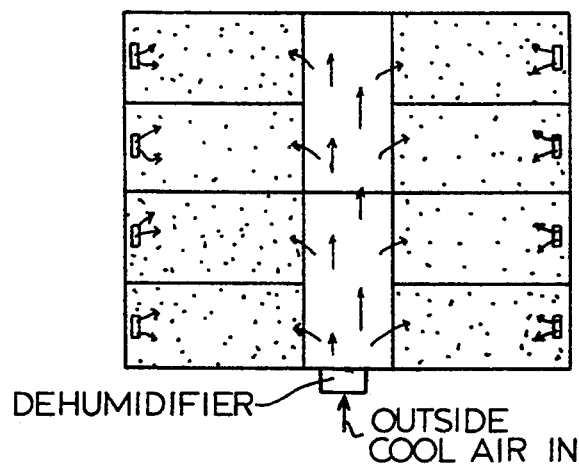
FIG. 9 is a schematic drawing of a preferred arrangement of floor panels.

As shown in FIG. 9, the floor panels 22 are preferably arranged so that the floor panels 22 having the heat retaining material 79 (shown by dots) are along opposite sides of the house. The panels 22 are aligned so that in the warmer months dehumidified air may be drawn into central floor panels which do not have heat retaining material. The air circulates, by fans or other means known in the art, through holes in the joists 72 and cross-joists 74 of adjacent floor panels 22, and into the house through floor air vents (FIG. 9) as are known in the art.

Figure 8:
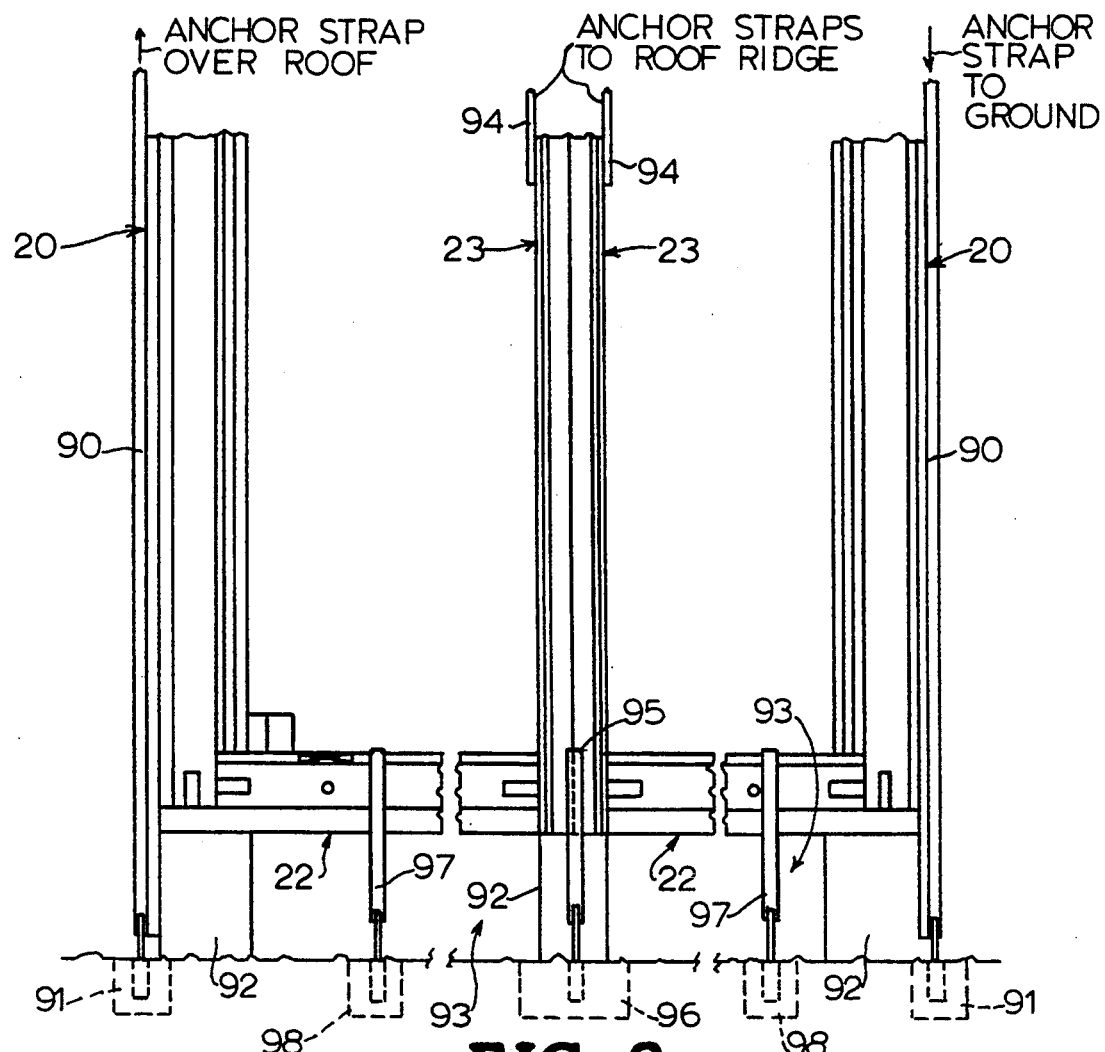
FIG. 8 is an elevational cross-sectional view of a modular home panels system of the present invention incorporating external tie-down straps and anchors and internal braces and connectors which in combination with the floor heat retention/distribution storage panels, render the modular home highly resistant to high winds during storms, hurricanes, etc.

Switching now to a general description of a further improvement provided of the present modular home panels air system, FIG. 8 illustrates a system which incorporates tie-down straps in conjunction with the present invention heat storage floor panel. Generally disclosed are tie-down straps 90 which pass over the home roof and which extend down outside wall panels 20. Both ends of tie downs 90 are anchored by conventional means in concrete pads 91. The modular home system of FIG. 8 is illustrated as being built upon a conventional foundation 92 so that the home has a crawl space 93 thereunder.

In the FIG. 8 embodiment, the modular home panel system is generally illustrated as having a pair of interior wall panels 23 mounted by conventional means within the interior of a house. A pair of previously described floor panels 22 filled with material 79 (not shown in this figure) are butted together and integrally connected as illustrated, by conventional means except where interior walls occur. Adjacent the top of interior wall panels 23, additional straps 94 tie the interior wall panels 23 to roof rafters (not shown) and the ridge (not shown) of the house. Adjacent the base of interior wall panels 23 are tie-down straps 95 attached to interior panels 23 and which attach to and extend through the floor panels 22 and are preferably anchored in concrete pads 96, and still further tie down straps 97 are attached to floor panels 22 and extend down into crawl space 93 and are anchored in concrete pads 98. As discussed above with respect to FIG. 10, to the extent increased building security and integrity are desired, additional brackets as are known in the art or as shown in the figure, as may be useful for particular areas of the modular panels, are used to attach these panels to the joists and the ground. Additional brackets may also be used to attach the base of particular interior walls to the upper surface of the floor panel.

With the added weight of floor panels 22 incorporating heat storing material 79 and the addition of tie down straps 90, 94, 95 and 97 and their associated anchor pads 91, 96 and 98, a modular home panel system which is highly wind/storm resistant is provided. Combined with the present heat storage and air delivery solar panel system, a highly desired modular home system is established.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A modular home panel system for air transfer and heat collection comprising:
   (a) panels, each panel being fastenable to other panels and to a roofing assembly,
   wherein each of said panels comprises a plurality of columns, each of said columns comprising:
      (i) a flat first side;
      (ii) a second side opposite said first side;
      (iii) a third side, a portion of which third side is perpendicular to said first side, said third side having a receptacle adjacent said first side and a protrusion adjacent said second side; and
      (iv) a fourth side, a portion of which fourth side is perpendicular to said first side, said fourth side having a protrusion adjacent said first side and a receptacle adjacent said second side; wherein said third and fourth sides of two adjacent columns are connected together by insertion of said protrusion on said third side of a first column into said receptacle on said fourth side of a second column, and insertion of said protrusion on said fourth side of said second column into said receptacle on said third side of said first column, and wherein a plurality of adjacent columns are joined together by said protrusions and receptacles to form sets of columns;
   and wherein each of said panels comprises:
      (i) a flat face formed by said first side of each column of a first set of columns, and
      (ii) a ribbed face formed by said second side of each column of said first set of columns;
   (b) a covering piece placed on said panels, wherein said covering piece and some of said panels form channels for transferring air;
   (c) a means for admitting forced air into said channels at a first end of a first panel through said channels to a second end of said first panel;
   (d) an air heating source;
   (e) a means for transferring air from said second end of said first panel into said air heating source;
   (f) a means for transferring air from said heating source into the channels at a first end of a second panel and through said channels to a second end of said second panel;
   (g) a heat collecting and storing floor panel;
   (h) a means for expelling air from said channels of said second panel at said second end into said heat collecting and storing floor panel;
   (i) a means for transferring air through said heat collecting floor panel;
   (j) a means for transferring air from said heat collecting and storing floor panel; said means also useful for directing heated air from said floor panel into said channels at said first end of said floor panel; and
   wherein said air makes a complete cycle through the modular home panel system.

2. The modular home panel system for air transfer and heat collection according to claim 1, wherein said heating source is a solar panel air system.

3. The modular home panel system for air transfer and heat collection according to claim 1, wherein said heat collecting and storing floor panel includes a frame, said frame receiving a heat retaining material and storing said material within said frame so that heated air from said second panel travels through said floor panel and said material acts to extract and store a portion of said heated air within said floor panel.

4. The modular home panel system of claim 3 and including tie-down and anchor means, said tie-down and anchor means being fixedly secured to said floor panel for anchoring said floor panel and thus said modular home to the earth beneath said floor panel so that said home is highly wind resistant.

5. The modular home panel system of claim 4 including a plurality of tie-down and anchor means extending from the ground, over the roof area of the home and back down to anchor means on the opposite side of said home thus providing further resistance to high winds and storms.

6. The modular home panel system of claim 3, further comprising means for taking cool air from beneath the floor panels and passing said air through said heat retaining material to cool said modular home.

7. A modular home panel system for air transfer and heat collection comprising:
   (a) modular panels comprising columns being attached together with protrusions and receptacles on opposite sides of said columns, each panel being fastenable to other panels and to a roofing assembly;
   (b) a covering piece placed on said panels, wherein said covering piece and some of said panels form channels for transferring air;
   (c) a means for admitting forced air into said channels at a first end of a first panel through said channels to a second end of said first panel;
   (d) an air heating source;
   (e) a means for transferring air from said second end of said first panel into said air heating source;
   (f) a means for transferring air from said heating source into the channels at a first end of a second panel and through said channels to a second end of said second panel;
   (g) a heat collecting and storing floor panel;
   (h) a means for expelling air from said channels of said second panel at said second end into said heat collecting and storing floor panel;
   (i) a means for transferring air through said heat collecting floor panel;
   (j) a means for transferring air from said heat collecting and storing floor panel; said means also useful for directing heated air from said floor panel into said channels at said first end of said floor panel; and
   wherein said air makes a complete cycle through the modular home panel system.

8. The modular home panel system of claim 7, wherein said heat collecting and storing floor panel includes a frame, said frame receiving a heat retaining material and storing said material within said frame so that heated air from said second panel travels through said floor panel and said material acts to extract and store a portion of said heated air within said floor panel.

9. The modular home panel system of claim 7 further comprising tie-down and anchor means, said tie-down and anchor means being fixedly secured to said floor panel for anchoring said floor panel and thus said modular home to the earth beneath said floor panel so that said home is highly wind resistant.

10. The modular home panel system of claim 9 further comprising a plurality of tie-down and anchor means extending from the ground, over the roof area of the home and back down to anchor means on the opposite side of said home thus providing further resistance to high winds and storms.

* * * * *